(12) United States Patent
Bojiuc

(10) Patent No.: US 7,834,503 B2
(45) Date of Patent: Nov. 16, 2010

(54) IMMERSED WINDINGS, MONOPOLE FIELD, ELECTROMAGNETIC ROTATING MACHINE

(75) Inventor: Dumitru Bojiuc, Marina Del Rey, CA (US)

(73) Assignee: Clearwater Holdings, Ltd., Marina Del Rey, CA (US)

( * ) Notice: Subject to any disclaimer, the term of this patent is extended or adjusted under 35 U.S.C. 154(b) by 303 days.

(21) Appl. No.: 12/075,348

(22) Filed: Mar. 10, 2008

(65) Prior Publication Data

US 2008/0164779 A1 Jul. 10, 2008

Related U.S. Application Data

(63) Continuation-in-part of application No. 11/200,920, filed on Aug. 9, 2005, now abandoned.

(60) Provisional application No. 60/603,444, filed on Aug. 20, 2004.

(51) Int. Cl.
*H02K 23/54* (2006.01)
*H02K 21/28* (2006.01)
*H02K 1/26* (2006.01)

(52) U.S. Cl. .................. 310/154.06; 310/208; 310/237; 310/268

(58) Field of Classification Search ................ 310/268, 310/154.05, 154.06, 154.23, 154.25, 154.32, 310/154.33, 198, 208, 237
See application file for complete search history.

(56) References Cited

U.S. PATENT DOCUMENTS

| 3,466,483 | A |   | 9/1969  | Johnson |        |
|-----------|---|---|---------|---------|--------|
| 3,997,806 | A | * | 12/1976 | Noto et al. | 310/268 |
| 4,188,556 | A | * | 2/1980  | Hahn    | 310/268 |
| 4,459,501 | A |   | 7/1984  | Fawzy   |        |
| 4,565,938 | A |   | 1/1986  | Fawzy   |        |
| 4,623,809 | A |   | 11/1986 | Westley |        |
| 4,677,334 | A | * | 6/1987  | Finegold et al. | 310/268 |
| 5,191,255 | A |   | 3/1993  | Kloosterhouse |  |
| 5,334,899 | A | * | 8/1994  | Skybyk  | 310/268 |
| 5,337,030 | A |   | 8/1994  | Mohler  |        |
| 5,349,259 | A | * | 9/1994  | Kaneko et al. | 310/208 |
| 5,907,210 | A | * | 5/1999  | Chaix   | 310/268 |
| 5,977,684 | A | * | 11/1999 | Lin     | 310/268 |
| 6,236,138 | B1| * | 5/2001  | Dunn    | 310/268 |
| 6,246,146 | B1| * | 6/2001  | Schiller| 310/268 |
| 6,507,257 | B2|   | 1/2003  | Mohler  |        |
| 6,531,799 | B1| * | 3/2003  | Miller  | 310/114 |

(Continued)

FOREIGN PATENT DOCUMENTS

DE         3140437      *  4/1983

(Continued)

*Primary Examiner*—Burton Mullins
(74) *Attorney, Agent, or Firm*—Gene Scott; Patent Law & Venture Group

(57) ABSTRACT

A rotating electromagnetic apparatus has a stator frame supporting spaced apart pairs of permanent magnets which are arranged with like magnetic poles mutually facing. A toroidally shaped rotor frame is radially wound with a plurality of wire coils immersed within slots in the in rotor frame, the slots positioned adjacent to the opposing magnets. An electromechanical commutator is used to direct current between an outside source or sink through brushes to rotating multiple contacts simultaneously. The brushes are triangular in cross section. The coils may be connected in series or parallel interconnection.

6 Claims, 8 Drawing Sheets

U.S. PATENT DOCUMENTS

| | | | |
|---|---|---|---|
| 6,803,691 B2 | 10/2004 | Rose | |
| 6,803,847 B2 * | 10/2004 | Burse | 336/173 |
| 2002/0135263 A1 | 9/2002 | Neal | |
| 2004/0135452 A1 | 7/2004 | Tu et al. | |

FOREIGN PATENT DOCUMENTS

| | | | |
|---|---|---|---|
| DE | 4336518 | * | 5/1994 |
| DE | 4442283 | * | 5/1996 |
| GB | 2255452 | * | 11/1992 |
| WO | WO 89/12347 | | 12/1989 |
| WO | 95/02915 | * | 1/1995 |
| WO | 98/10506 | * | 3/1998 |
| WO | 02089292 | * | 11/2002 |

* cited by examiner

IMMERSED WINDINGS, MONOPOLE FIELD, ELECTROMAGNETIC ROTATING MACHINE

RELATED APPLICATIONS

This application is a continuation-in-part application with non-provisional parent patent application Ser. No. 11/200,920, filed on Aug. 9, 2005 now abandoned, and claims international date priority thereof based on a prior provisional patent application 60/603,444, filed on Aug. 20, 2004. The subject matter of application Ser. Nos. 11/200,920 and 60/603,444 is hereby incorporated by reference into the present CIP application.

BACKGROUND

1. Field of the Present Disclosure

This disclosure relates generally to electric motors and generators and more particularly to a rotating electromagnetic machine having a coil wound rotor wherein the coils are fully immersed in slots on the sides of the rotor and wherein the coils rotate through monopole magnetic fields produced by laterally positioned opposing permanent magnets.

2. Description of Related Art

The following art defines the present state of the field of the apparatus described and claimed herein. Tu et al, US 2004/0135452, discloses a flat rotary electric generator including at least one toroidal coil structure and at least one disc-shaped magnetic pole structure oriented parallel to the coil structure. Neal, US 2002/0135263, discloses a plurality of stator arc segments forming a toroidal core for a stator assembly. Rose, U.S. Pat. No. 6,803,691, discloses an electrical machine comprising a magnetically permeable core centered on an axis of rotation and having two axially-opposite sides, and coils wound toroidally about the core. Mohler, U.S. Pat. No. 6,507,257, discloses a bi-directional latching actuator. Mohler, U.S. Pat. No. 5,337,030, discloses a permanent magnet brushless torque actuator. Kloosterhouse et al, U.S. Pat. No. 5,191,255, discloses an electromagnetic motor including a rotor having a plurality of magnets mounted along a perimeter of the rotor. Westley, U.S. Pat. No. 4,623,809, discloses a stepper motor. Fawzy, U.S. Pat. No. 4,565,938 and U.S. Pat. No. 4,459,501 discloses an electromechanical device having disc magnets poled to have alternating polarity and mounted on a rotatable shaft to define a rotor. Adam, WO 89/12347 discloses a rotating frame with coils passing between monopole magnetic fields, but the rotor coils are not immersed fully within slots of the rotating frame. Johnson, U.S. Pat. No. 3,466,483 discloses a rotating frame on an axle supported by a stator frame.

However, the prior art fails to teach a rotating electromagnetic machine that provides radial rotor windings fully immersed in side slots of a rotor frame of permeable material. Further, the prior art fails to teach the winding arrangements herein disclosed and illustrated.

SUMMARY

This disclosure teaches certain benefits in construction and use which give rise to the objectives described below.

A rotating electromagnetic apparatus has a stator including a stator frame supporting parallel spaced apart, disc-shaped permanent magnet sets. Each of the magnet sets is formed as plural, spaced apart, co-planar magnet segments. The segments are arranged with permanent magnet poles of opposite polarity in an alternating sequence, but each spaced apart pair of the magnets are mounted with N-N or S-S facing poles thereby generating a monopole magnetic field in the rotor operating space. The rotor provides a magnetically permeable frame mounted on an axle and supported by the stator frame. The rotor frame provides a plurality of radially oriented, toroidally wound coils fully immersed within slots of the rotor frame that are adjacent to the magnet pole faces. A commutator provides current to the rotor coils and in one embodiment the coils are arranged in parallel electrical interconnection with each of the coils in communion with the commutator through an electrical wiper contact. In another arrangement the coils are in series electrical interconnection. The machine may be operated in DC or AC modes.

A primary objective inherent in the above described apparatus and method of use is to provide advantages not taught by the prior art.

A further objective is to provide such an apparatus that is able to be operated as a DC or as an AC device and as a motor or a generator.

A still further objective is to provide such a machine with significant improvement in performance due to winding immersion in the rotor slots.

Other features and advantages of the described apparatus and method of use will become apparent from the following more detailed description, taken in conjunction with the accompanying drawings, which illustrate, by way of example, the principles of the presently described apparatus and method of its use.

BRIEF DESCRIPTION OF THE DRAWINGS

The accompanying drawings illustrate at least one of the best mode embodiments of the present apparatus and method of it use. In such drawings.

DETAILED DESCRIPTION

The above described drawing figures illustrate the described apparatus and its method of use in several of its preferred embodiments, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 2:
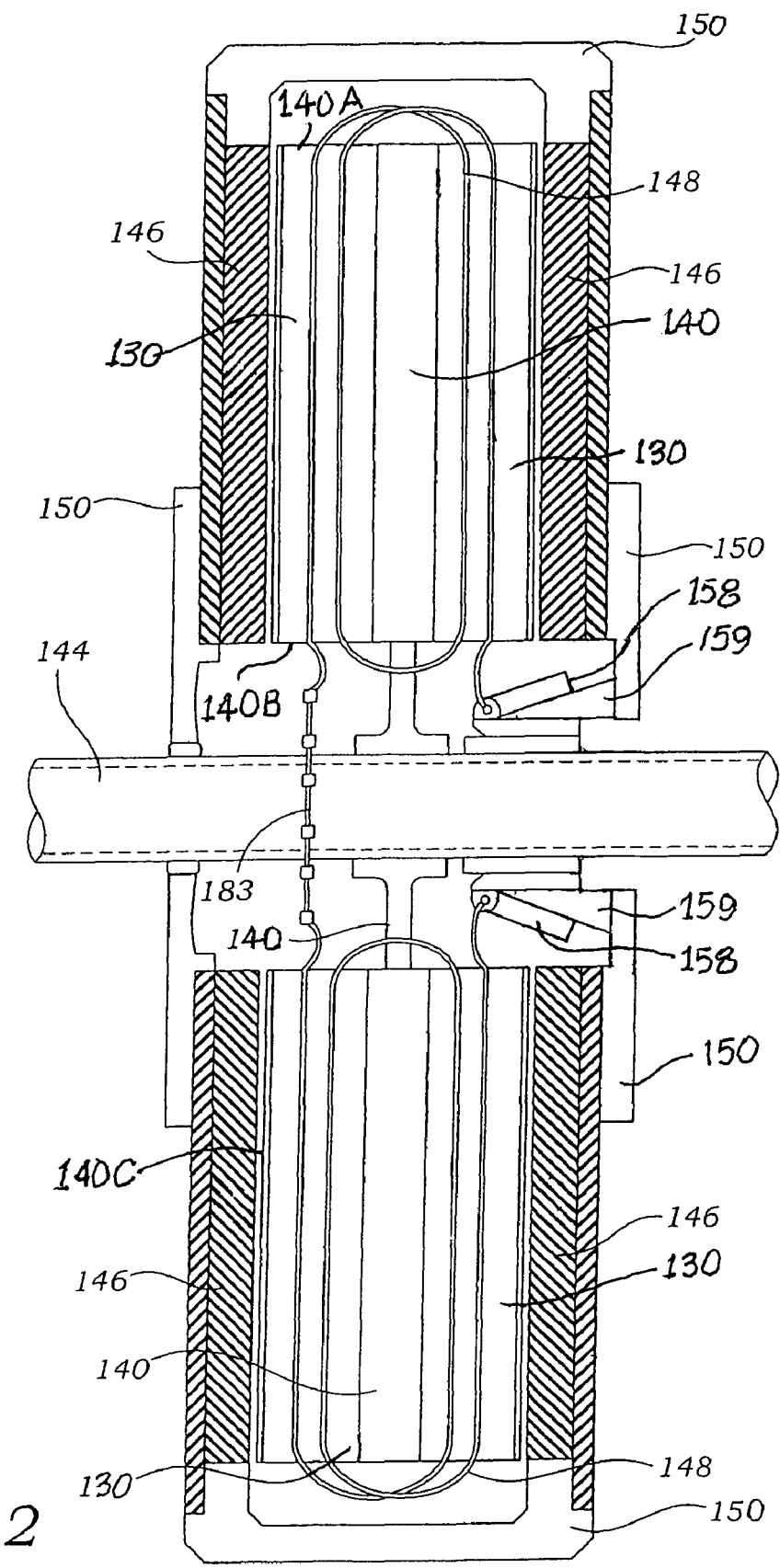
FIG. 2 is a vertical cross-sectional view thereof taken along line 2-2 in FIG. 1.

The present invention is a rotating electromagnetic apparatus having a stator frame 150 supporting permanent magnets 146 as shown schematically in FIG. 2. The permanent magnets 146 are arranged in pairs as best shown in FIGS. 3-6 with like magnetic poles in mutually facing positions, that is, north "N" facing "N" and south "S" facing south "S". Any number of pairs of the magnets 146 may be used in the present invention.

Figure 1:
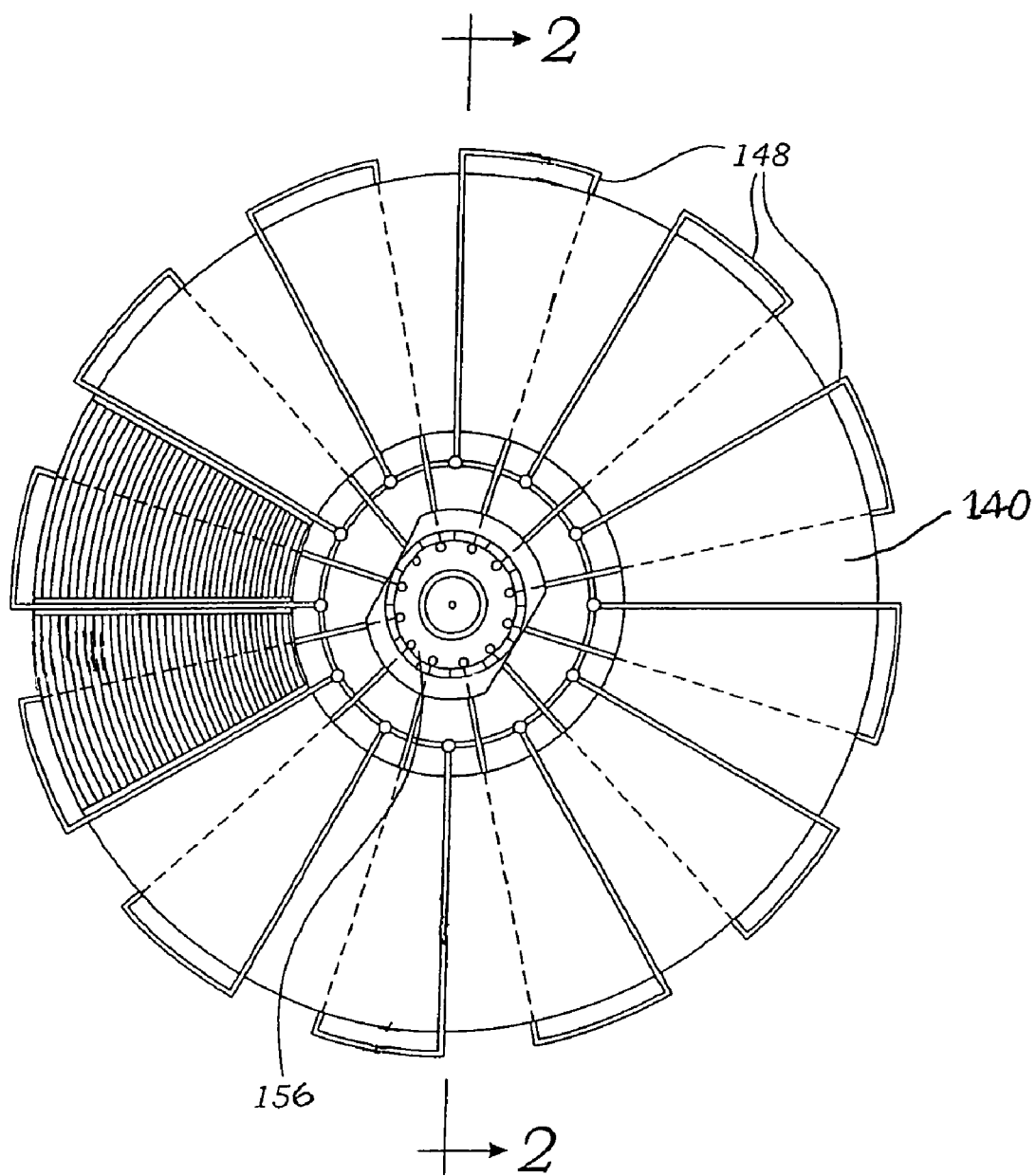
FIG. 1 is a schematic diagram of a side view of a rotor frame of the present apparatus showing one preferred wiring arrangement of coils with a commutator having wedge shaped wipers.
Figure 7A:
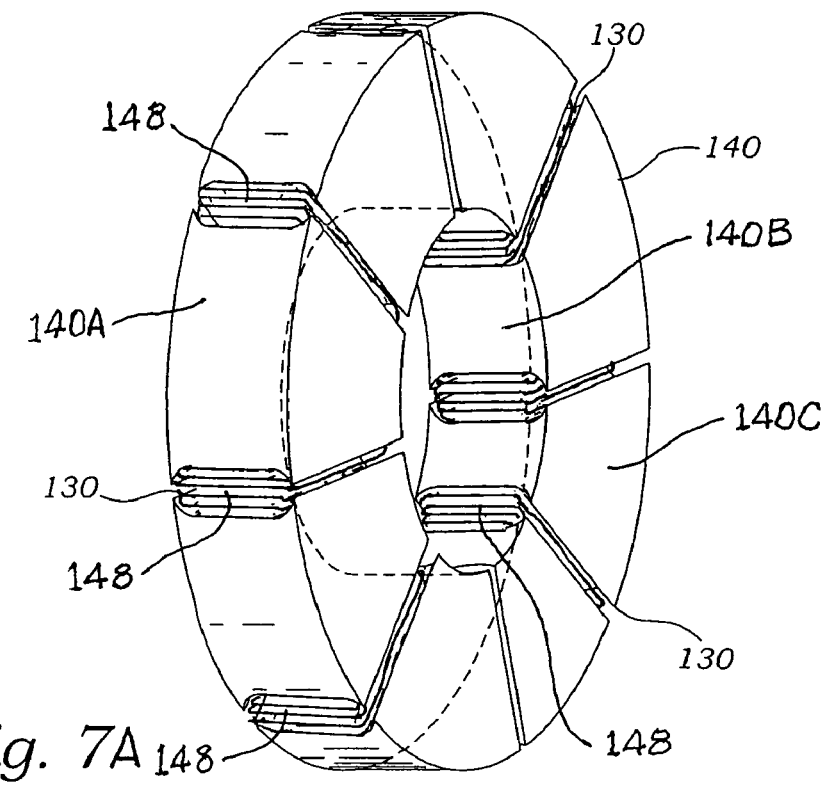
FIGS. 7A and 7B are perspective views of the rotor frame showing slot and the coil winding therein.

The apparatus also includes a toroidally shaped rotor frame 140 of magnetically permeable material such as sintered iron, as best shown in FIGS. 1 and 7. Frame 140 has an outer circumferential surface 140A, an inner circumferential surface 140B, and a pair of parallel side surfaces 140C. The rotor frame 140 is positioned adjacent to the pairs of permanent magnets 146 when the rotor frame 140 is mounted on an axle 144 rotationally supported by the stator frame 150, as is clearly shown in FIG. 2. The rotor frame 140 has a plurality of spaced apart pairs of radially directed cylindrical or parallelepipedic shaped slots 130 in the side surfaces 140C, the slots 130 extending between the inner 140B and the outer 140A circumferential surfaces. The slots 130 extend into the rotor frame 140 through relatively narrow openings which broaden to relatively wider apertures within the rotor frame 140 so that wire coils 148 are able to be contained therein.

Figure 7B:
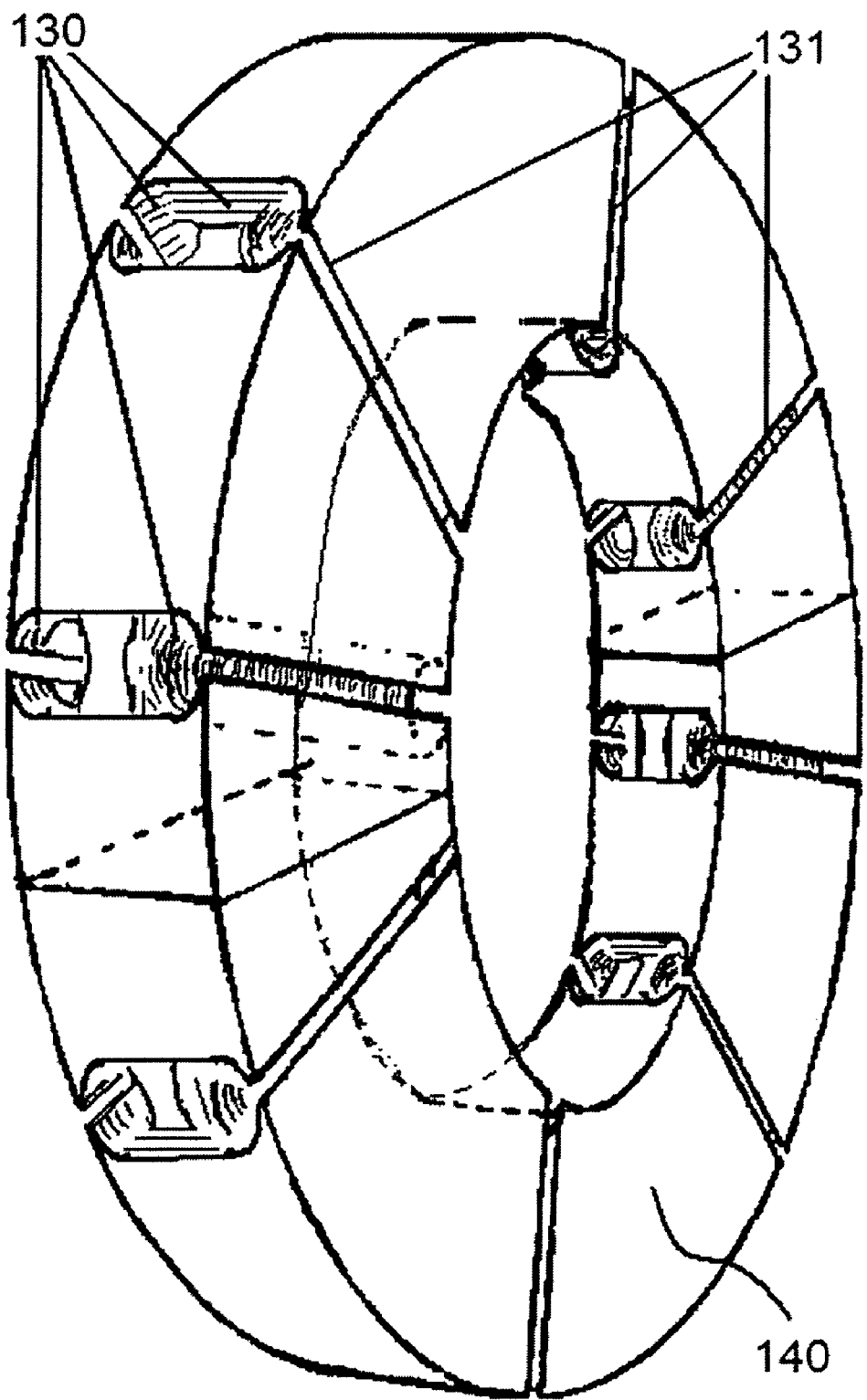

A plurality of the wire coils 148 are wound around the rotor frame 140, with each one of the wire coils 148 lying within one of the pairs of opposing slots 130 and contiguously therefrom, across the outer 140A and inner 140B circumferential surfaces. It is particularly pointed out that the wire coils 148 to not extend laterally away from, nor are they positioned on, the side surfaces 140C. In fact, the portions of the wire coils 148 that lie in the slots 130 are fully immersed within rotor frame 140. The positions and conformation of the wire coils 148 are shown best in FIG. 7A and schematically in FIG. 2. In FIG. 7B is a preferred manner of forming the rotor frame 140 showing the slots 130 as extending fully around the rotor frame 140 so that the windings do not protrude outwardly from the rotor frame 140 whatsoever, but are fully immersed within the rotor frame 140.

Figure 9:
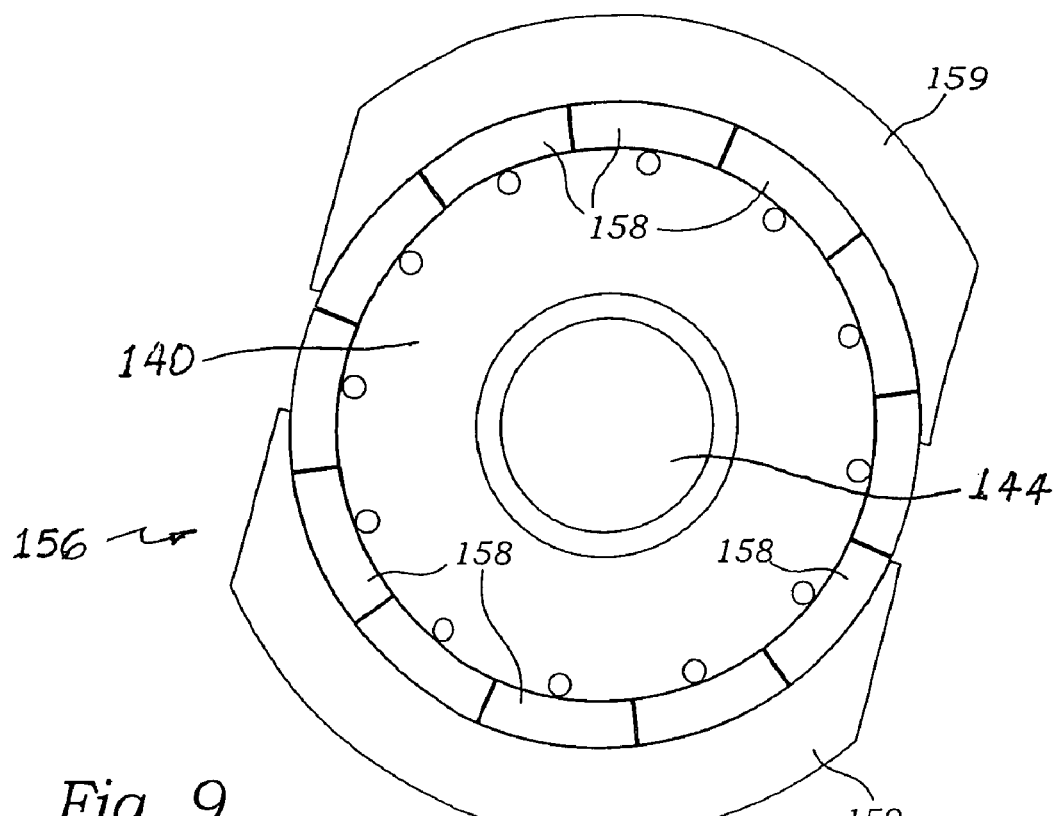
FIG. 9 is an enlarged view of the commutator shown in Fig.
Figure 10:
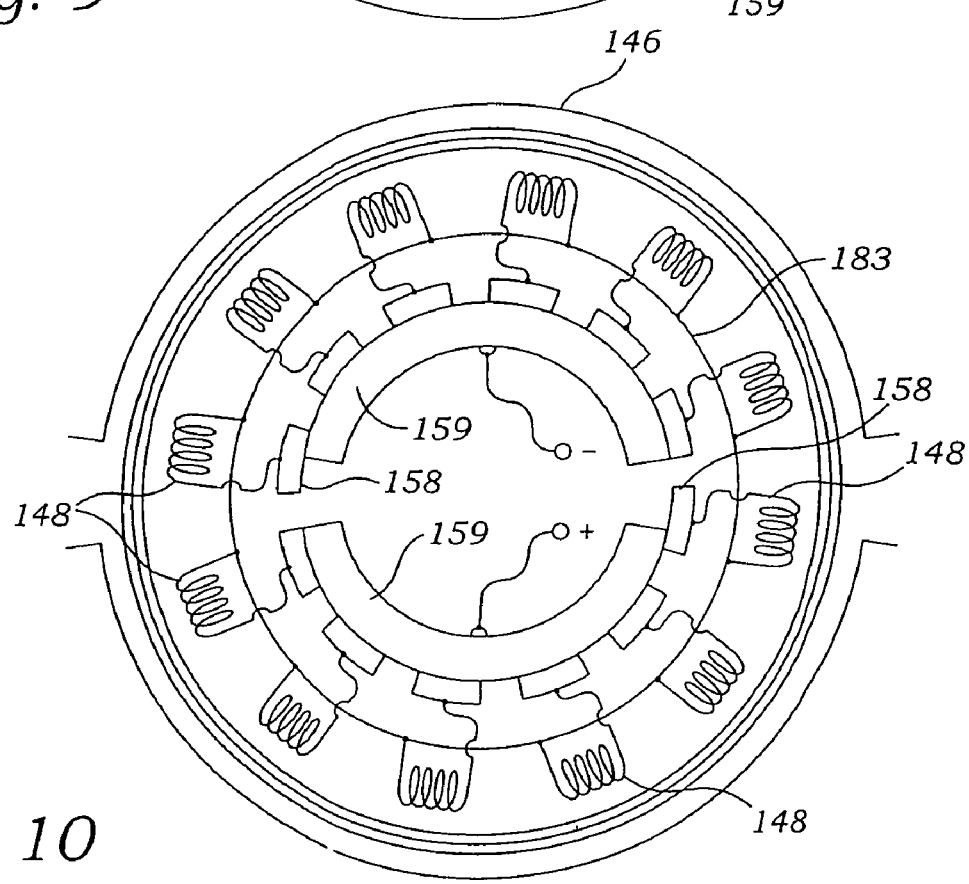
FIG. 10 is an electrical schematic diagram of the apparatus showing one preferred arrangement of the coil windings relative to the commutator.

As shown schematically in FIG. 9, a commutator assembly 156 includes a plurality of mutually isolated electrical contacts 158 mounted on the rotor frame 140 and rotate with it. Each one of the contacts 158 is in electrical common with one of the wire coils 148 as shown in FIG. 10. The wire coils 148 thereby make brief electrical contact with each one of a plurality of fixed brushes 159 that are mounted on the stator frame 150 as shown in FIG. 2. As shown in FIG. 9, in relationship with the magnet arrangement of FIG. 3, the brushes 159 may be curved to conform with the circular surface of the contacts 158, and this arrangement is considered to be novel because each brush 159 is able to feed a total current from one half of the commutator's contacts 158. This arrangement is a very protective safety measure which allows a large amount of current to be used through the commutator without overheating the brushes 159, the contacts 158, or the coils.

Figure 4:
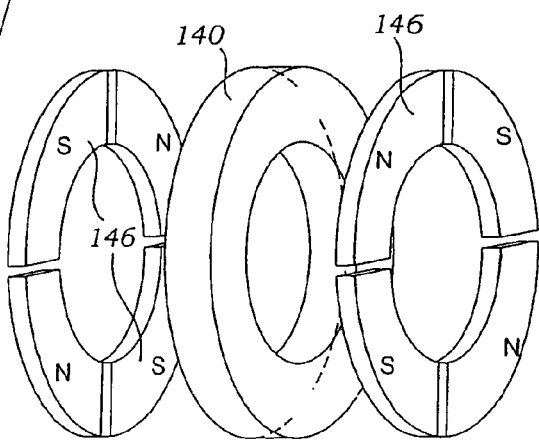
Figure 5:
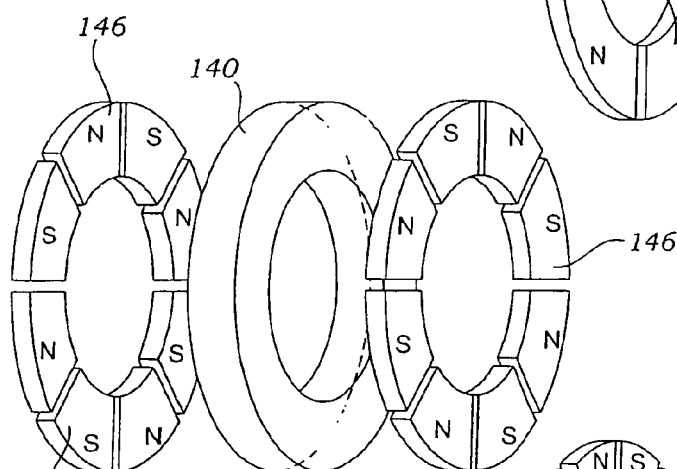
Figure 6:
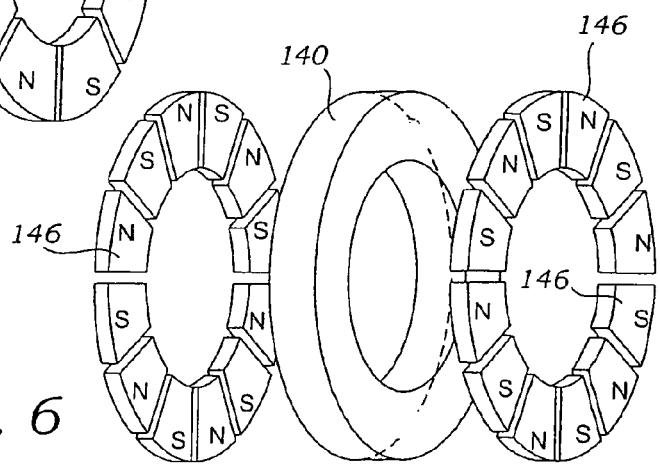
Figure 8:
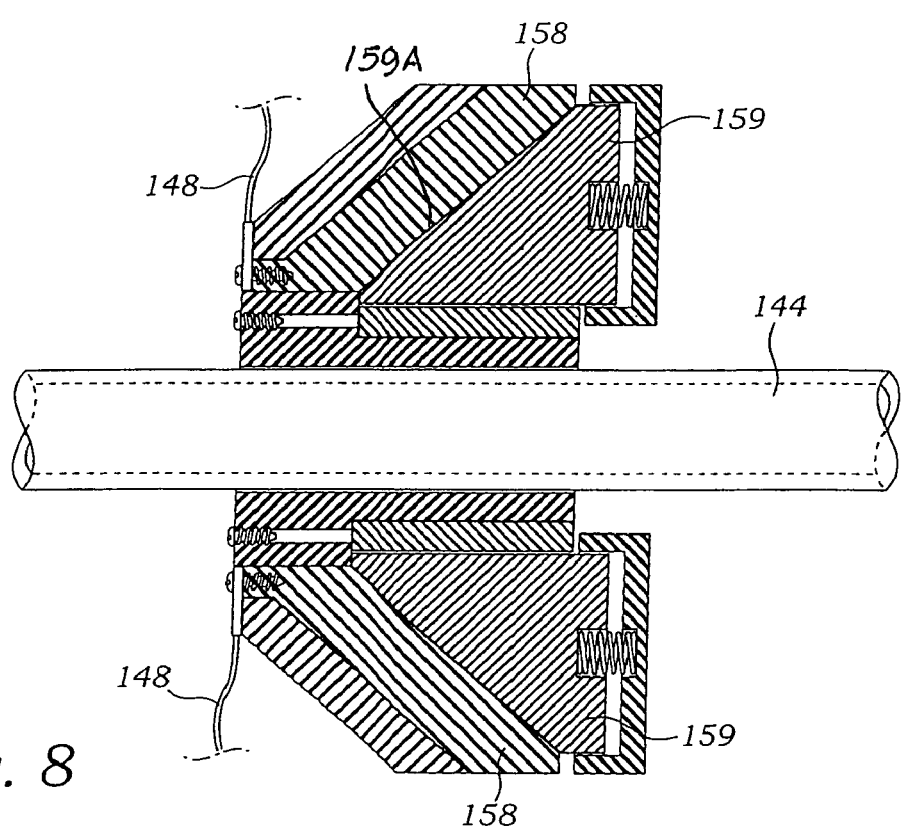
FIG. 8 is a cross-sectional view of a commutator of the apparatus.

Clearly, when a larger number of pairs of permanent magnets are used, as shown in FIGS. 4-6, a corresponding larger number of brushes 159 may be employed. In the preferred embodiment and with the clear reason to maximize the contact surface, each of the brushes 159 approximates a generally right-triangular cross-sectional shape, as shown in FIG. 8, which provides a hypotenuse surface 159A thereon. The respective moving contacts 158 make face-to-face sliding contact with the hypotenuse surfaces 159A during rotation of the rotor frame 140 and this configuration provides a significant improvement in wear life of the brushes 159 which are typically made of carbon, a relatively soft material. Contacts 158 are typically made of a conductive metal which is selected for its improved wear resistance.

Figure 3:
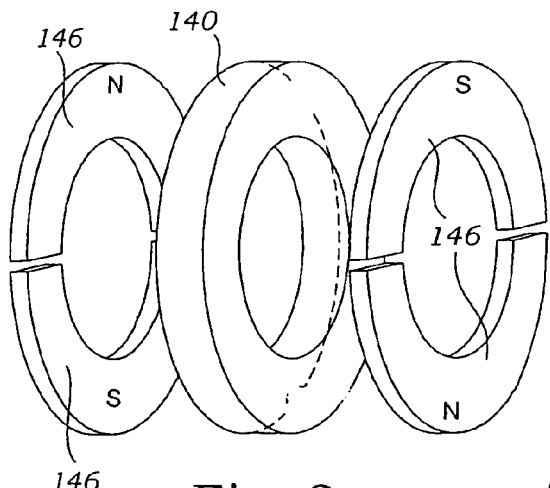
FIGS. 3-6 are generalized perspective exploded views of typical arrangements of magnet sets relative to the rotor of FIG. 1, where the rotors are not shown with details of coils or mountings.

The wire coils 148 may be arrange in different electrical configurations in order to achieve various machine operating characteristics. In a preferred configuration, shown in FIG. 10, each wire coil 148 is common with one of the contacts 158 and diametrically opposing pairs of the wire coils 148 are in electrical series connection, and also, all of the coils 148 are in electrical parallel interconnection, i.e., they have a common point 183. In FIG. 10, the magnet set of FIG. 3 is applicable.

Figure 11:
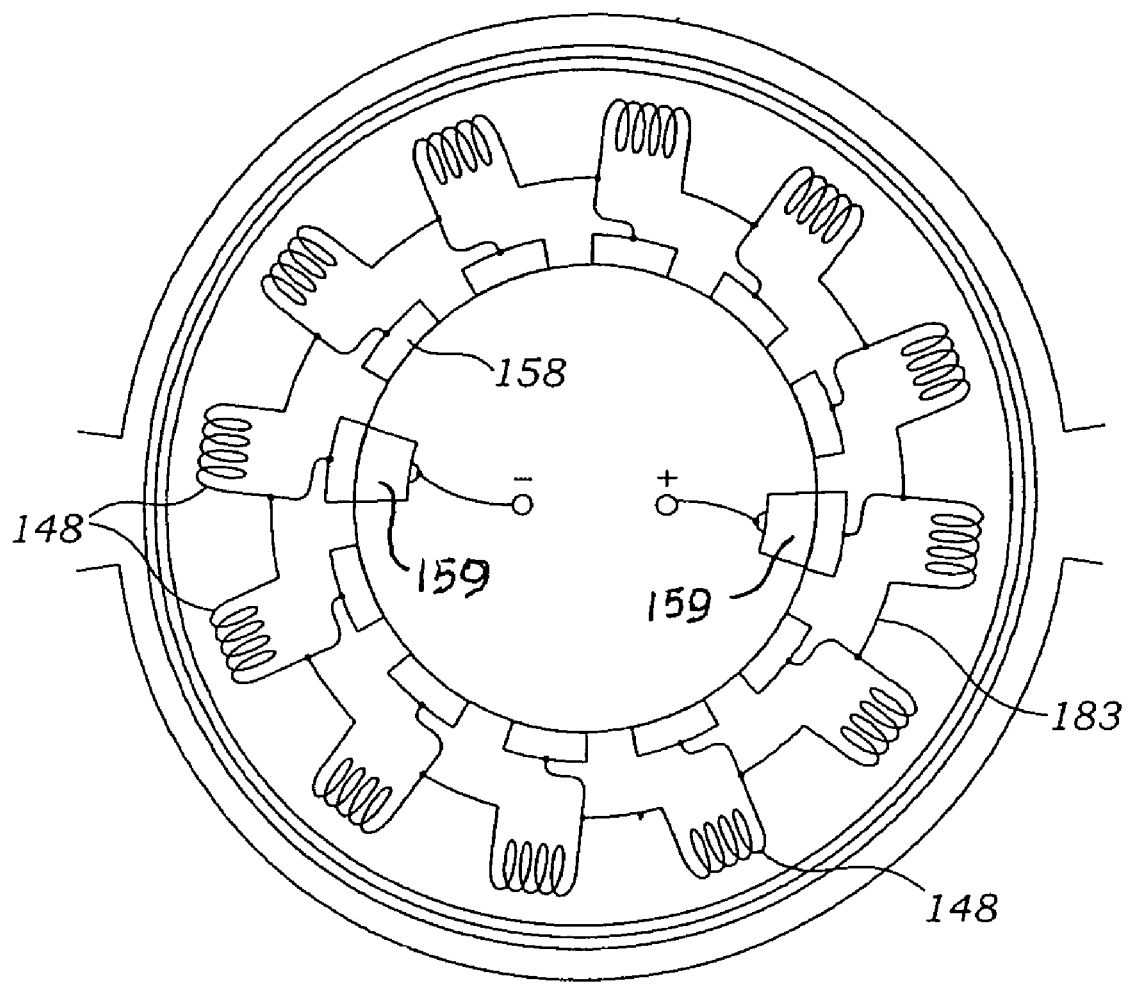
FIG. 11 is an electrical schematic diagram of the apparatus showing a further preferred arrangement of the coil windings relative to the commutator.

Alternately, as shown in FIG. 11, each wire coil 148 is interconnected in common with one of the contacts 158, as described above, and diametrically opposing pairs of the wire coils 148 make contact with brushes 159 sequentially, while all of the wire coils 148 are arranged in electrical series interconnection. In FIG. 11, the magnet set shown in FIG. 3 is applicable.

Figure 12:
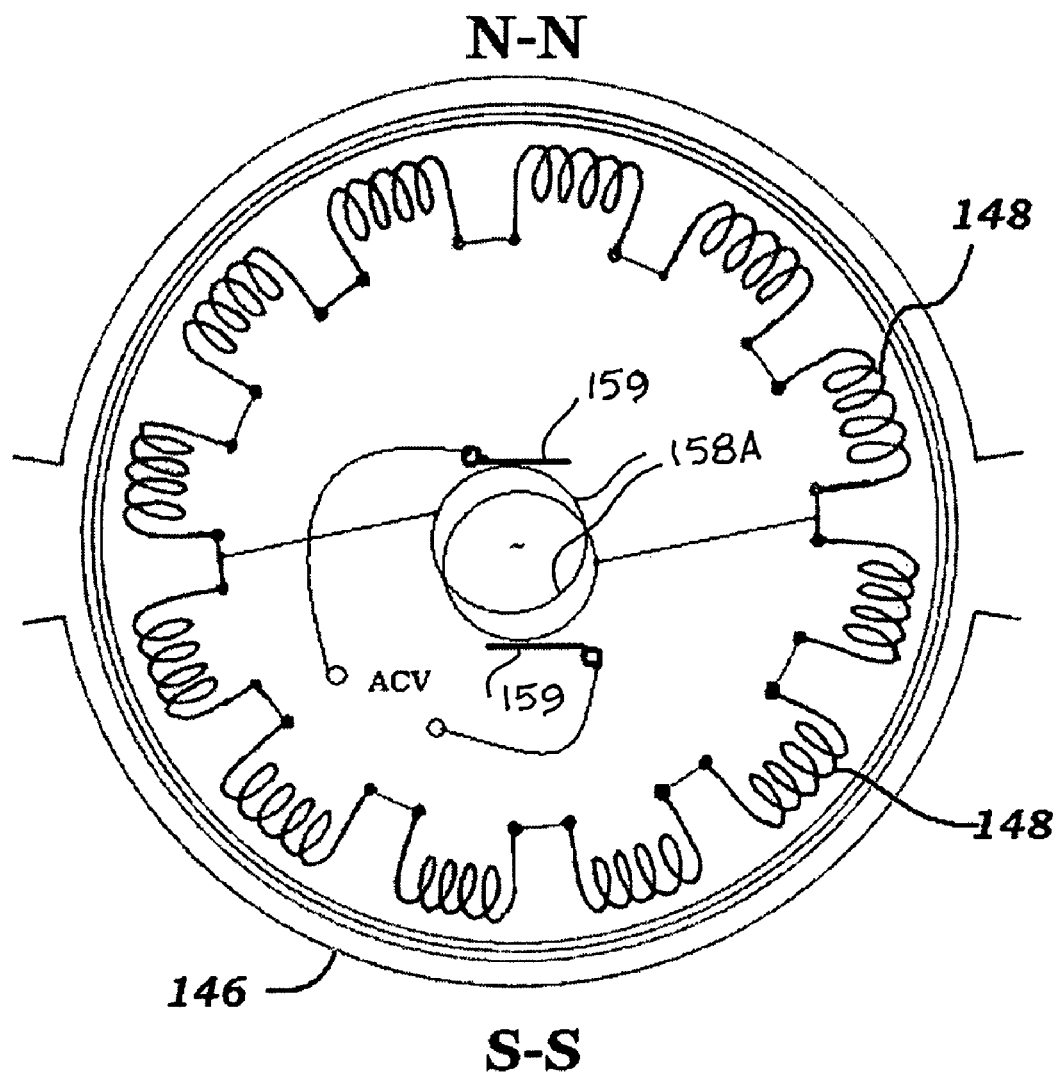
FIG. 12 is an electrical schematic diagram of the apparatus showing a further preferred arrangement of the coil windings relative to a slip ring commutator in an alternating current machine.

In a still further alternate arrangement designed for alternating current operation, as shown in FIG. 12, all of the wire coils 148 are interconnected in electrical series. A double slip ring commutator 158A provides electrical interconnection between an AC electrical source or sink through brushes 159. In FIG. 12, the magnet set shown in FIG. 3 is applicable.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A rotating electromagnetic apparatus comprising:

a stator frame supporting spaced apart pairs of permanent magnets, the permanent magnet pairs arranged with like magnetic poles thereof in mutually facing positions;

a toroidally shaped rotor frame of magnetically permeable material having an outer circumferential surface, an inner circumferential surface, and a pair of side surfaces positioned adjacent to the pairs of permanent magnets, the rotor frame mounted on an axle rotationally supported by the stator frame, the rotor frame having a plurality of spaced apart pairs of radially directed slots in the side surfaces; a plurality of wire coils wound around the rotor frame, with each one of the wire coils lying inside one of the spaced apart pairs of the slots and on the outer and inner circumferential surfaces, wherein no part of the wire coils extends laterally away from, or on, the side surfaces, and a plurality of contacts mounted on the rotor frame and rotational therewith, each one of the contacts in electrical common with one of the wire coils, the wire coils thereby in brief electrical communion with each one of a plurality of fixed brushes mounted on the stator frame, the brushes each having a generally right-triangular cross-sectional shape providing a hypotenuse surface thereon in position for contacing the contacts during rotation of the rotor frame.

2. The rotating electromagnetic apparatus of claim 1 further comprising an electromechanical commutator having a number of brushes equal to a number of permanent magnet poles of the permanent magnets facing the rotor frame, each of the brushes connected with all of the wire coils immersed in one of a magnetic field of one of the permanent magnets.

3. The rotating electromagnetic apparatus of claim 2 wherein the wire coils are in electrical common interconnection, with each one of the coils further in electrical common with one of the contacts.

4. The rotating electromagnetic apparatus of claim 1 wherein the respective contacts are in face-to-face sliding contact with the hypotenuse surfaces during rotation of the rotor frame.

5. The rotating electromagnetic apparatus of claim 1 wherein diametrically opposing pairs of the wire coils are in electrical series connection.

6. The rotating electromagnetic apparatus of claim 1 wherein the wire coils are in series electrical connection with opposing pairs of the wire coils positioned for making contact sequentially with opposing pairs of the brushes.

* * * * *